(12) United States Patent
Ranta

(10) Patent No.: US 9,787,609 B2
(45) Date of Patent: Oct. 10, 2017

(54) METHODS AND APPARATUS FOR TRANSMITTING DATA

(71) Applicant: AVAGO TECHNOLOGIES GENERAL IP (SINGAPORE) PTE. LTD., Singapore (SG)

(72) Inventor: Jukka Tapio Ranta, Kaarina (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 140 days.

(21) Appl. No.: 14/411,168

(22) PCT Filed: Jun. 27, 2013

(86) PCT No.: PCT/IB2013/055289
§ 371 (c)(1),
(2) Date: Dec. 24, 2014

(87) PCT Pub. No.: WO2014/002048
PCT Pub. Date: Jan. 3, 2014

(65) Prior Publication Data
US 2015/0195217 A1     Jul. 9, 2015

(30) Foreign Application Priority Data

Jun. 27, 2012 (GB) .................................. 1211419.5

(51) Int. Cl.
*H04W 28/04*     (2009.01)
*H04L 12/939*    (2013.01)
(Continued)

(52) U.S. Cl.
CPC .......... *H04L 49/552* (2013.01); *H04L 1/1825* (2013.01); *H04L 1/1887* (2013.01);
(Continued)

(58) Field of Classification Search
CPC ................................ H04W 28/04; H04W 4/18
See application file for complete search history.

(56) References Cited

U.S. PATENT DOCUMENTS

| | | | |
|---|---|---|---|
| 2008/0049754 A1* | 2/2008 | Kim | ........................ H04L 1/165 370/394 |
| 2009/0103511 A1 | 4/2009 | Marinier et al. | |
| (Continued) | | | |

FOREIGN PATENT DOCUMENTS

| | | |
|---|---|---|
| EP | 2 129 034 | 12/2009 |
| EP | 2 141 949 | 1/2010 |
| WO | 2009 045882 | 4/2009 |

OTHER PUBLICATIONS

3GPP TSG-RAN WG2 #61bis R2-081587, "Correction to RLC PDU size", LG Electronics Inc., pp. 1-8, (Mar. 31 to Apr. 4, 3008) XP 050139319.

(Continued)

*Primary Examiner* — Huy D Vu
*Assistant Examiner* — Teisha D Hall
(74) *Attorney, Agent, or Firm* — Oblon, McClelland, Maier & Neustadt, L.L.P.

(57) ABSTRACT

A method, apparatus and computer program product are provided for facilitating transmission of data. A method and apparatus may detect one or more items of data that were transmitted with at least one error or unsuccessfully delivered to a device. The method and apparatus may enable retransmission of the items of data in at least one transport block. The method and apparatus may enable transmission of one or more items of new data in the at least one transport block such that a size of the new data does not exceed a variable size limit of a transport block size. The variable size limit may be dependent on one or more sizes of one or more transport blocks. The method and apparatus may determine (Continued)

that the variable size limit comprises a size smaller than a size of the at least one transport block.

18 Claims, 6 Drawing Sheets

(51) Int. Cl.
  *H04L 1/18* (2006.01)
  *H04W 4/18* (2009.01)
  *H04W 28/02* (2009.01)
(52) U.S. Cl.
  CPC ............. *H04L 1/1896* (2013.01); *H04W 4/18* (2013.01); *H04W 28/0278* (2013.01); *H04W 28/04* (2013.01)

(56) References Cited

U.S. PATENT DOCUMENTS

2009/0190526 A1* 7/2009 Pani .................. H04L 47/36
                                                                370/328
2009/0296625 A1  12/2009 Wu
2009/0323671 A1  12/2009 Wu
2012/0307723 A1  12/2012 Pani et al.

OTHER PUBLICATIONS

International Search Report Issued Mar. 14, 2014 in PCT/IB13/055289 Filed Jun. 27, 2013.

* cited by examiner

METHODS AND APPARATUS FOR TRANSMITTING DATA

TECHNICAL FIELD

Embodiments of the present invention relate generally to wireless communications technology and, more particularly, to a method and apparatus for provision of automatic repeat requests to improve reliability of data transmissions in a communications system.

BACKGROUND

Currently, automatic repeat request (ARQ) is one of the fundamental techniques in improving the reliability of data transmission in communications networks where transmission errors are possible. Several ARQ protocols exist, but a common characteristic for all of them is the basic idea that a Receiver requests a retransmission of the data packets that the Receiver has not received. There are several ways in which a Receiver may determine that a packet was not received.

For instance, the Receiver may determine that a packet was not received in an instance in which the packet does not arrive when it was expected to arrive. Additionally, the Receiver may determine that a packet was not received in an instance in which the packet is marked with a sequence number and a packet with a greater than expected sequence number is received. As another example, the Receiver may determine that a packet was not received in an instance in which the received packet is broken. The received packet may be broken in an instance in which there are bit errors in the packet.

There are also various mechanisms in which a Transmitter may determine that a Receiver has not received a transmitted packet. For instance, the Transmitter may determine that a Receiver has not received a transmitted packet(s) in an instance in which a Receiver reports or acknowledges the received packets with a status report and one of the transmitted packets is not acknowledged as received. The Transmitter may also determine that a Receiver has not received a transmitted packet in an instance in which a Receiver does not send an acknowledgement in time.

The Receiver typically sends a status report either regularly or according to other criteria to a Transmitter. The status report is typically a list of missing data packets (e.g., using some form of packet identifier, usually the sequence number) and the identifier of the most recent correctly received packet. The status report may be sent to a Transmitter regularly at fixed or other time intervals. Additionally, the status report may be sent regularly after receiving a certain number of packets. As another example, the status report may be sent to a Transmitter regularly after receiving a certain amount of data or after detecting that a packet has been lost. The status report may also be sent by a Receiver to a Transmitter when the Transmitter requests a status report explicitly. This is typically implemented by setting a "polling flag" in the header of the transmitted data packet.

There are often several layers of ARQ protocols on top of each other. For instance, in Universal Mobile Telecommunications System (UMTS) and Long Term Evolution (LTE), the physical layer uses Hybrid Automatic Repeat Request (HARM) with incremental redundancy to achieve a certain reliability of packet transmission. The residual errors are managed with another ARQ protocol in the Radio Link Control (RLC), which is a sublayer of Layer 2. Although the RLC typically guarantees practically an error-free transmission, the Transmission Control Protocol (TCP) and Internet Protocol (IP) (TCP/IP) stack has also its own ARQ mechanism.

The radio channel has a number of challenging properties and one of the problems is the fact that the size of the transport blocks may be variable and the size of each data packet handled by the ARQ protocol may be variable. There are several reasons for this. For instance, the fading of the radio channel is addressed in LTE so that the physical layer adjusts the transmission rate according to the fluctuations in the channel capacity and allocates transport blocks of variable size to the upper layer accordingly. Additionally, the radio resources are shared by several User Equipment (UE) devices, so the amount of available resources depends on the congestion.

Several logical channels are multiplexed on a single transport channel, so the share each logical channel gets of a transport block may be different each time. In LTE, for instance, each logical channel has its own ARQ process, so this alone may cause variation in the available packet size from the ARQ point of view.

The amount of variation in the transport block size may depend on the cell type (e.g., macro, micro, pico, or femto cell), the number of UEs in one cell, and the motion of a UE. The variation typically gets smaller in an instance in which the cell size gets smaller.

The variable packet size may be a problem for the ARQ retransmissions, because a packet may not be easily retransmitted if the available transport block is smaller than the packet to be retransmitted. Several mechanisms exist to address the problem but these existing mechanisms still have drawbacks, as described more fully below.

For instance, the RLC layer of the UMTS attempts to minimize the problem by using a very small RLC Protocol Data Unit (PDU) size. This is accomplished by segmenting the RLC PDUs in small pieces such that each of the pieces separately may fit in any transport block, even the smallest possible transport blocks. This naturally means that a large amount of RLC PDUs are concatenated in the Medium Access Control (MAC) layer when the transport block is filled.

Currently, there are several problems with the UMTS approach. For instance, the segmentation of the RLC PDUs to small RLC PDUs may be a heavy task and as such the processing load may undesirably increase with the high data rates. There is also a certain amount of padding at the end of the transport block. If the processing load problem is alleviated by increasing the RLC PDU size, the average padding gets larger. However, minimizing the padding by making the RLC PDU smaller may exacerbate the processing load problem by increasing the processing load. Also, the range of the RLC PDU sequence numbers may need to be relatively large to maintain unambiguity.

The RLC of the LTE attempts to solve some of the problems with the UMTS approach so that the RLC PDU sizes are matched to the transport block sizes; for example, the physical layer identifies for each transmission the size of the transport block. Furthermore, the MAC layer typically allocates a certain portion of the transport block for each logical channel according to their priorities and amounts of data waiting to be transmitted. Each logical channel has its own RLC entity which takes care of filling the RLC PDU with the data of the corresponding logical channel. The RLC also takes care of the retransmissions according to the ARQ procedure. The problem of retransmitting a RLC PDU that is larger than the allocated piece of the transport block is solved so that the RLC PDU is re-segmented into smaller blocks. The segmented parts are generally identified by having the size and the byte offset of each segment expressed in the re-segmentation header of the re-segmentation extension of the RLC PDU format. The size of each re-segmented piece may be determined in the same way as the size of the original RLC PDUs. For example, the size of each re-segmented piece may be determined based on the largest possible size that fits into the allocated piece of the transport block.

Although the LTE solution is better than the UMTS solution, the LTE solution still has some problems and drawbacks. For instance, re-segmenting a RLC PDU may be tedious and the RLC PDU header structure may be complicated with the re-segmentation extensions. Moreover, the handling of sequence numbers of the re-segmented parts may be complicated and make the RLC specification rather complex and unclear.

In view of the foregoing problems and drawbacks, it may be desirable to provide an efficient and reliable mechanism to improve the efficiency of ARQ procedures in a communications system.

SUMMARY

In one example embodiment, a method for transmission of data is provided that includes detecting one or more items of data that were transmitted with at least one error or unsuccessfully delivered to a device. The method further includes enabling retransmission of the items of data in at least one transport block. The method further includes enabling transmission of one or more items of new data in the at least one transport block such that a size of a protocol data unit including the new data does not exceed a variable size limit of a transport block. The variable size limit may be dependent on one or more sizes of one or more transport blocks. The method further includes determining that the variable size limit has a size smaller than a size of the at least one transport block.

In another example embodiment, an apparatus for transmission of data is provided that includes a processing system. The processing system may be embodied by at least one processor and at least one memory including computer program code. The processing system is arranged to cause the apparatus at least to detect one or more items of data that were transmitted with at least one error or unsuccessfully delivered to a device. The processing system is also arranged to cause the apparatus to enable retransmission of the items of data in at least one transport block. The processing system is also arranged to cause the apparatus to enable transmission of one or more items of new data in the at least one transport block such that a size of a protocol data unit including the new data does not exceed a variable size limit of a transport block. The variable size limit may be dependent on one or more sizes of one or more transport blocks. The processing system is also arranged to cause the apparatus to determine that the variable size limit has a size smaller than a size of the at least one transport block.

In another example embodiment, a computer program product is provided that comprises a set of instructions, which, when executed by a computing device, causes the computing device to perform the steps of: detecting one or more items of data that were transmitted with at least one error or unsuccessfully delivered to a device; enabling retransmission of the items of data in at least one transport block; and enabling transmission of one or more items of new data in the at least one transport block such that a size of a protocol data unit including the new data does not exceed a variable size limit of a transport block. The variable size limit may be dependent on one or more sizes of one or more transport blocks. Further, when executed by the computing system, the set of instructions are configured to cause the computing system to determine that the variable size limit has a size smaller than a size of the at least one transport block.

In another example embodiment, an apparatus is provided that includes means for detecting one or more items of data that were transmitted with at least one error or unsuccessfully delivered to a device. The apparatus further includes means for enabling retransmission of the items of data in at least one transport block and means for enabling transmission of one or more items of new data in the at least one transport block such that a size of a protocol data unit including the new data does not exceed a variable size limit of a transport block. The variable size limit may be dependent on one or more sizes of one or more transport blocks. The apparatus further includes means for determining that the variable size limit has a size smaller than a size of the at least one transport block.

In one example embodiment, a method for receiving data is provided, the method enabling provision of a status report to a device indicating one or more items of data that were received with at least one error or unsuccessfully delivered. The method further includes receiving a control message from the device indicating a size of a transport block that is needed to retransmit at least one protocol data unit, which was previously received incorrectly or missing from receipt of the protocol data unit, in response to an indication from the device that a size of a candidate transport block among a plurality of transport blocks is not large enough to transfer content of the protocol data unit, and enabling provision of a temporary transport block to the device in response to receipt of the control message, the temporary transport block comprising a size equal to the indicated size of the transport block to enable the device to retransmit the protocol data unit. The method further includes receiving a retransmission, from the device, of the items of data in at least one transport block in response to receipt of the status report, the at least one transport block comprising at least the temporary transport block. The method further includes receiving, from the device, one or more items of new data in the at least one transport block wherein a size of a protocol data unit including the new data does not exceed a variable size limit of a transport block. The variable size limit may be dependent on one or more sizes of one or more transport blocks. The variable size limit may have a size smaller than a size of the at least one transport block.

In another example embodiment, an apparatus is provided that comprises a processing system, which may be embodied as at least one processor and at least one memory including computer program code. The processing system is arranged to cause the apparatus at least to enable provision of a status report to a device indicating one or more items of data that were received with at least one error or unsuccessfully delivered. The processing system is arranged to cause the apparatus to receive a control message from the device indicating a size of a transport block that is needed to retransmit at least one protocol data unit, which was previously received incorrectly or missing from receipt of the protocol data unit, in response to an indication from the device that a size of a candidate transport block among a plurality of transport blocks is not large enough to transfer content of the protocol data unit. The processing system is arranged to cause the apparatus to enable provision of a temporary transport block to the device in response to receipt of the control message, the temporary transport block comprising a size equal to the indicated size of the transport block to enable the device to retransmit the protocol data unit. The processing system is arranged to cause the apparatus to receive a retransmission, from the device, of the items of data in at least one transport block in response to receipt of the status report, the at least one transport block comprising at least the temporary transport block. The processing system is arranged to cause the apparatus to receive, from the device, one or more items of new data in the at least one transport block wherein a size of a protocol data unit including the new data does not exceed a variable size limit of a transport block. The variable size limit may be dependent on one or more sizes of one or more transport blocks. The variable size limit may have a size smaller than a size of the at least one transport block.

In another example embodiment, a computer program product is provided that comprises a set of instructions, which, when executed by a computing device, causes the computing device to perform the steps of: providing a status report to a device indicating one or more items of data that were received with at least one error or unsuccessfully delivered; receiving a control message from the device indicating a size of a transport block that is needed to retransmit at least one protocol data unit, which was previously received incorrectly or missing from receipt of the protocol data unit, in response to an indication from the device that a size of a candidate transport block among a plurality of transport blocks is not large enough to transfer content of the protocol data unit; enabling provision of a temporary transport block to the device in response to receipt of the control message, the temporary transport block comprising a size equal to the indicated size of the transport block to enable the device to retransmit the protocol data unit; receiving a retransmission, from the device, of the items of data in at least one transport block in response to receipt of the status report, the at least one transport block comprising at least the temporary transport block; receiving, from the device, one or more items of new data in the at least one transport block wherein a size of a protocol data unit including the new data does not exceed a variable size limit of a transport block; The variable size limit may be dependent on one or more sizes of one or more transport blocks. The variable size limit may have a size smaller than a size of the at least one transport block.

In another example embodiment, an apparatus is provided that includes means for enabling provision of a status report to a device indicating one or more items of data that were received with at least one error or unsuccessfully delivered. The apparatus further includes means for receiving a control message from the device indicating a size of a transport block that is needed to retransmit at least one protocol data unit, which was previously received incorrectly or missing from receipt of the protocol data unit, in response to an indication from the device that a size of a candidate transport block among a plurality of transport blocks is not large enough to transfer content of the protocol data unit. The apparatus further includes means for enabling provision of a temporary transport block to the device in response to receipt of the control message, the temporary transport block comprising a size equal to the indicated size of the transport block to enable the device to retransmit the protocol data unit. The apparatus further includes means for receiving a retransmission, from the device, of the items of data in at least one transport block in response to receipt of the status report, the at least one transport block comprising at least the temporary transport block. The apparatus further includes means for receiving, from the device, one or more items of new data in the at least one transport block wherein a size of a protocol data unit including the new data does not exceed a variable size limit of a transport block. The variable size limit may be dependent on one or more sizes of one or more transport blocks. The variable size limit may have a size smaller than a size of the at least one transport block.

Further features and advantages of the invention will become apparent from the following description of preferred embodiments of the invention, given by way of example only, which is made with reference to the accompanying drawings

BRIEF DESCRIPTION OF THE DRAWINGS

Figure 1:
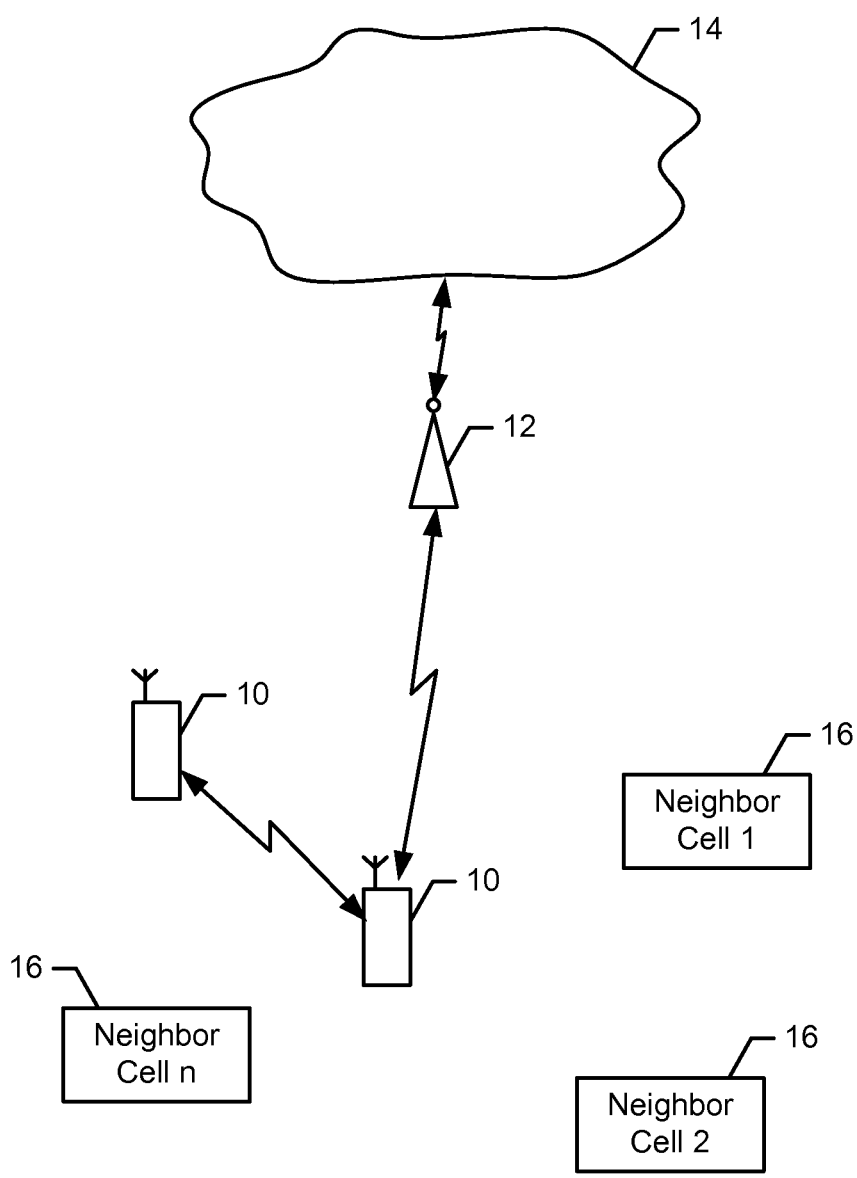
Figure 2:
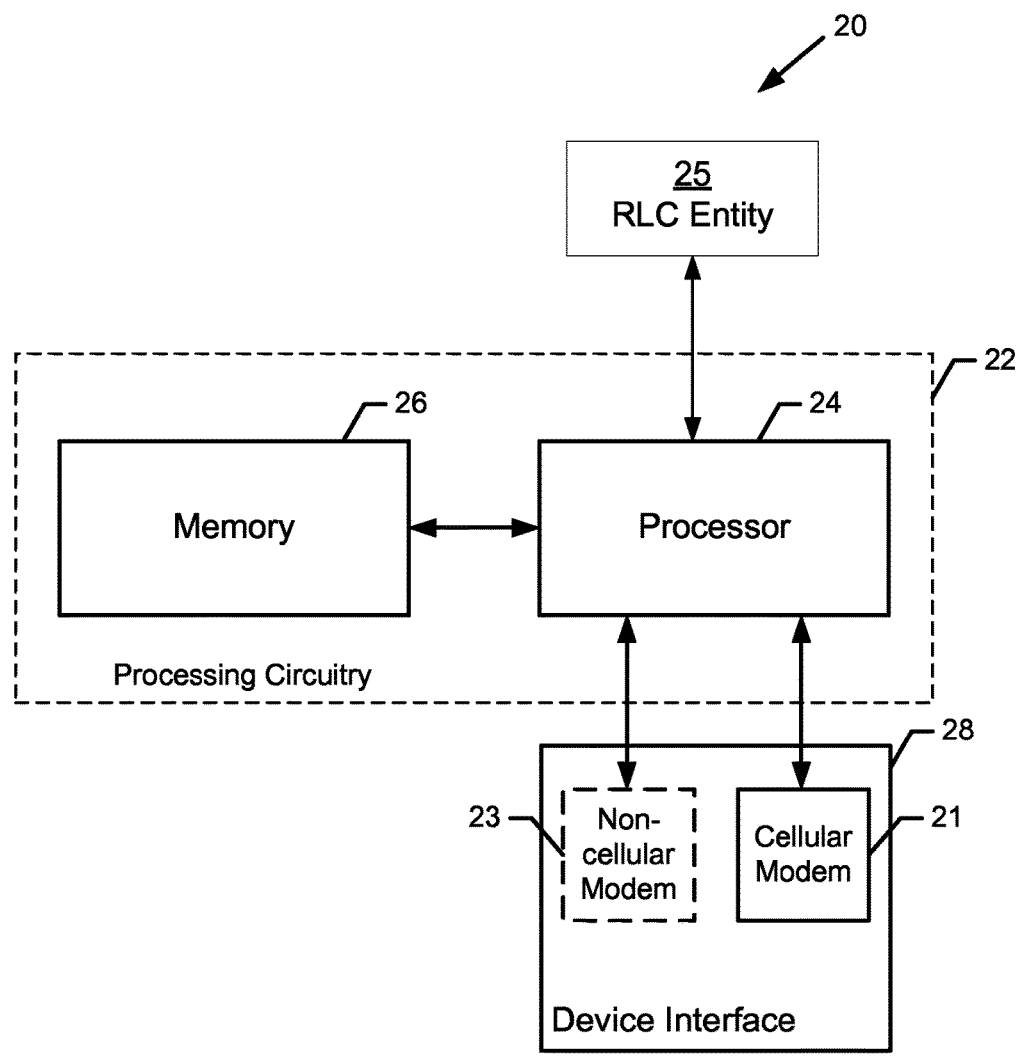
Figure 3:
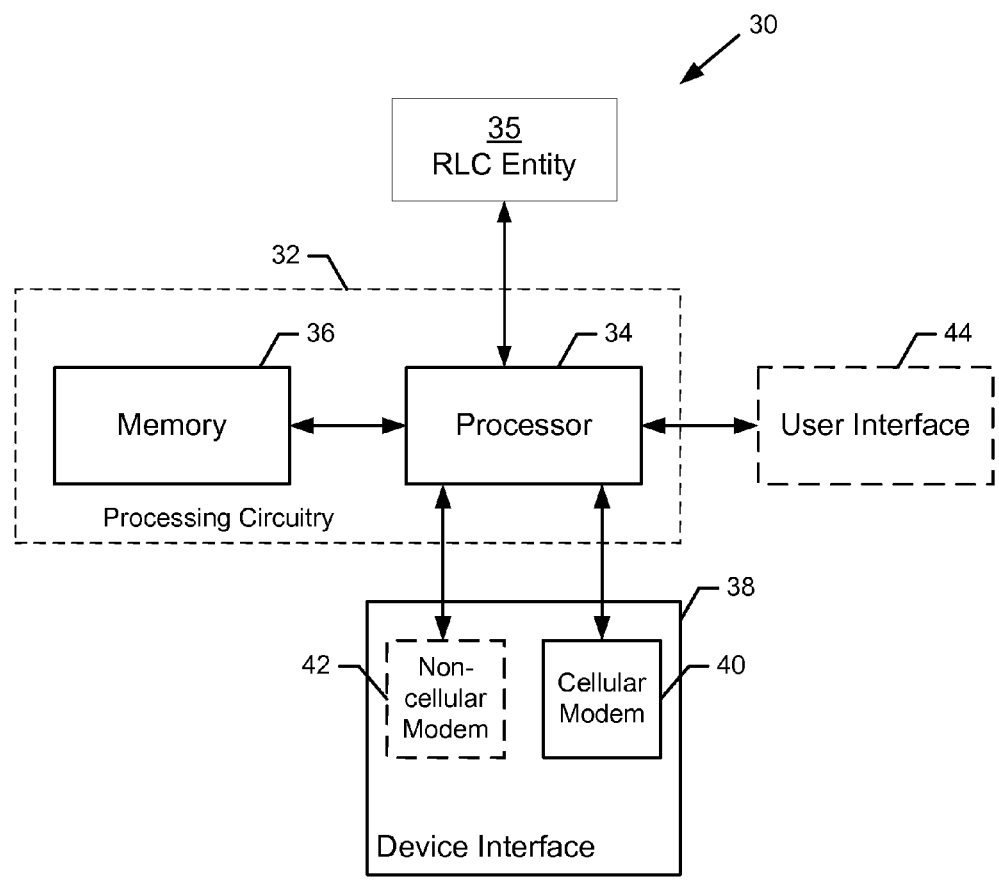
Figure 4:
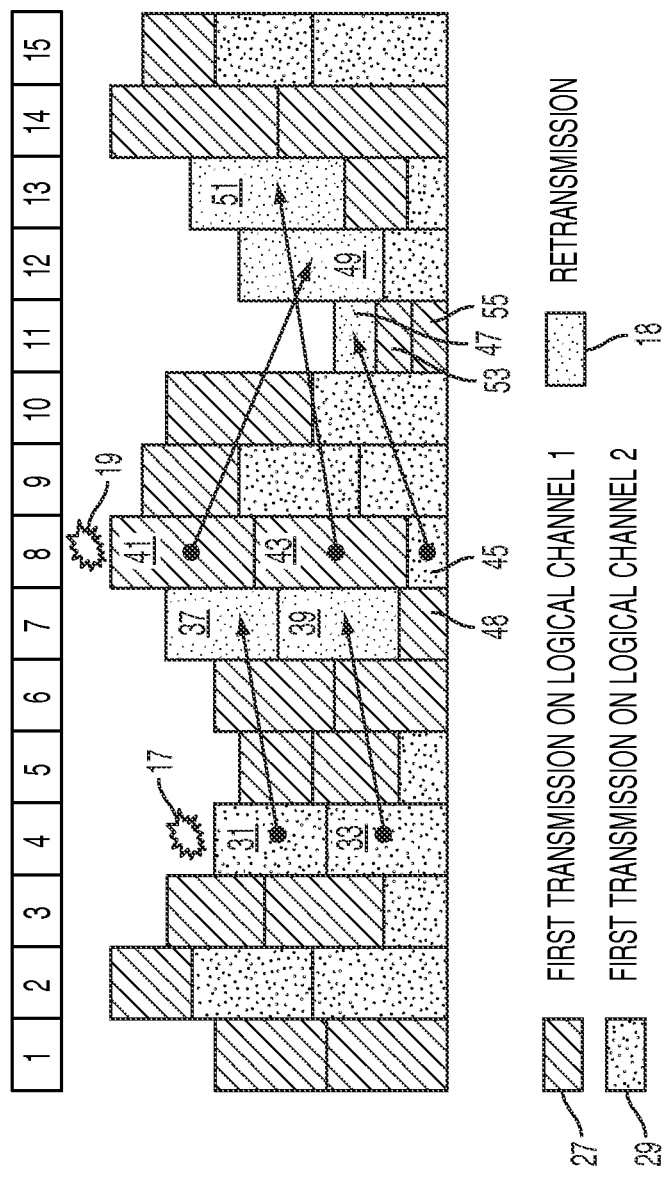
Figure 5:
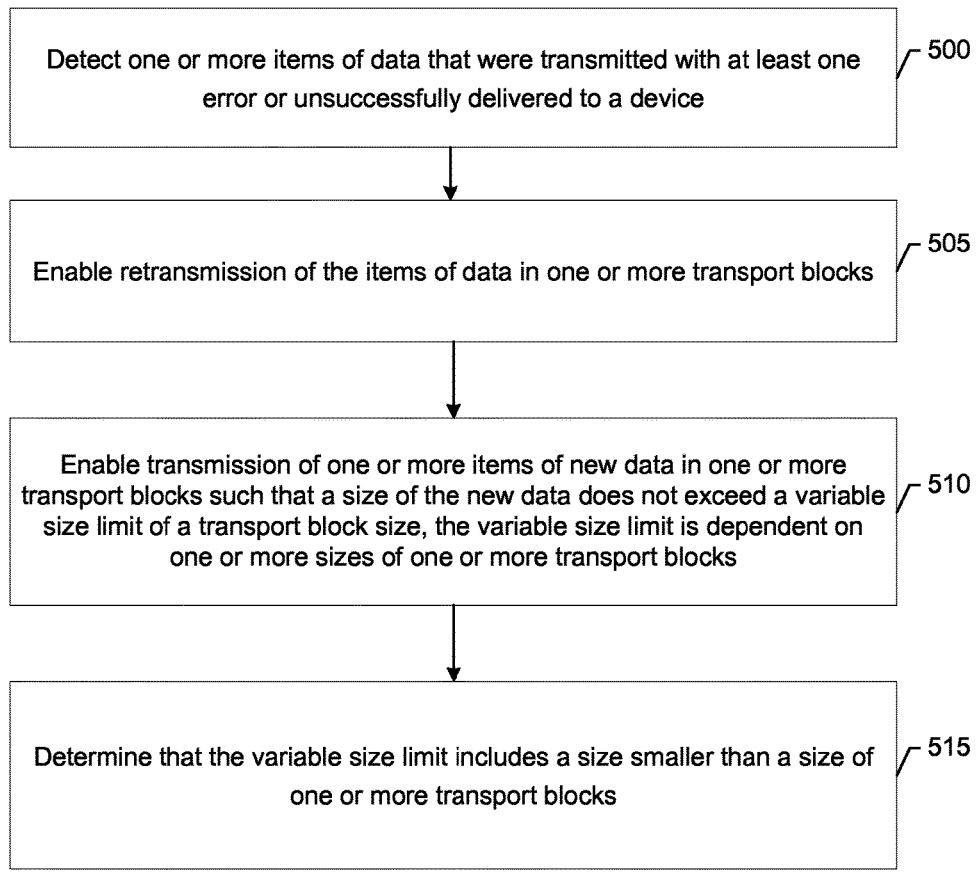
Figure 6:
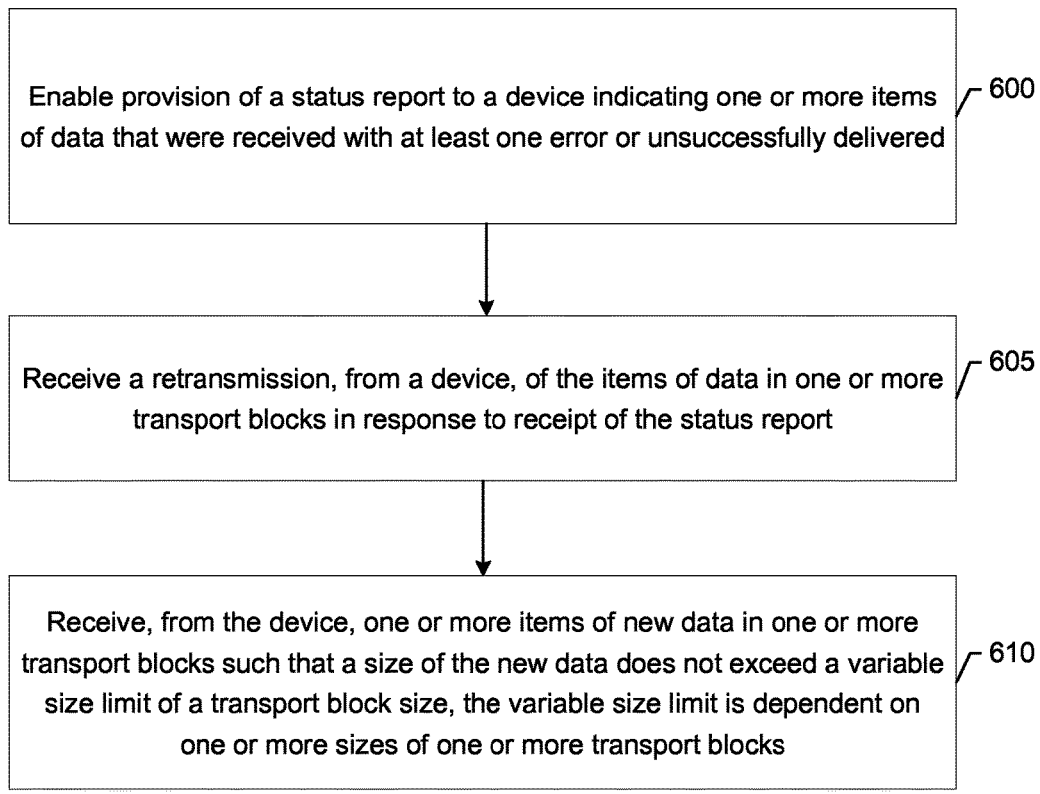

Having thus described the invention in general terms, reference will now be made to the accompanying drawings, which are not necessarily drawn to scale, and wherein:

FIG. 1 is a schematic representation of a system that may benefit from an example embodiment;

FIG. 2 is a schematic block diagram of an apparatus from the perspective of a base station in accordance with an example embodiment;

FIG. 3 is a block diagram of an apparatus that may be embodied by a mobile terminal in accordance with an example embodiment;

FIG. 4 is a diagram illustrating transport blocks including PDUs in accordance with an example embodiment;

FIG. 5 is a flowchart illustrating operations performed in accordance with one example embodiment; and FIG. 6 is a flowchart of operations performed in accordance with another example embodiment.

DETAILED DESCRIPTION

A method, apparatus and computer program product are provided according to example embodiments in order to provide an efficient and reliable manner for retransmitting data. In some example embodiments the retransmission of data corresponds to an ARQ protocol.

Some example embodiments may provide an efficient and reliable manner in which to retransmit data packets that were incorrectly received or unsuccessfully delivered to a receiving device such that retransmitted data packets are kept smaller than a variable transport block size for transferring the retransmitted data packets.

In one example embodiment, a PDU(s) including new data may not exceed a variable fixed size limit (e.g., half a size of a transport block, 60% of a size of a transport block, etc.) of a transport block(s) that is going to be used to transfer the PDU(s). Data for retransmission may also be transmitted in the transfer block(s).

In an example embodiment, one or more allocations to different logical channels may be performed flexibly so that the needed capacity from a channel(s) may be borrowed from another logical channel to facilitate retransmissions of data. An example embodiment may delay the retransmission of a PDU(s) in an instance in which a candidate transport block(s) is not large enough to transfer the retransmitted data. In this regard, the retransmission of the PDU(s) may be retransmitted in a next or subsequent transfer block after the delay or expiration of a time period associated with the delay.

By utilizing the example embodiments, the need for re-segmentation of PDUs into smaller blocks according to some of the existing approaches may be alleviated. Some example embodiments may be utilized in an RLC layer as well as any other suitable layers.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a Protocol Data Unit(s) (PDU(s)) (also referred to herein interchangeably as RLC PDU(s)) may refer to a data packet(s) that may include one or more items of retransmitted data (e.g., blocks) (e.g., transport blocks) that were received incorrectly or unsuccessfully delivered to a receiving device. Additionally or alternatively, as referred to herein, a PDU(s) may include one or more items of new data that may be error free or received properly at a receiving device.

Referring now to FIG. 1, a system according to an example embodiment is provided. The system of FIG. 1 includes a first communication device (e.g., mobile terminal 10) that is capable of communication via a serving cell 12, such as a base station, a Node B, an evolved Node B (eNB), a radio network controller (RNC) or other access point, with a network 14 (e.g., a core network). While the network may be configured in accordance with Universal Mobile Telecommunications System (UMTS), Long Term Evolution (LTE™) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including serving cell 12 and one or more neighbor cells 16 (designated neighbor cell 1, neighbor cell 2, ... neighbor cell n in the embodiment of FIG. 1), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also referred to herein as User Equipment (UE) 10), may be in communication with other communication devices or other devices via the serving cell 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, a neighbor cell 16 and/or the serving cell 12 (also referred to herein as eNB 12) may be embodied as or otherwise include an apparatus 20 as generically represented by the block diagram of FIG. 2. Additionally, in one example embodiment, the mobile terminal 10 may be embodied as or otherwise include an apparatus 30 as generically represented by the block diagram of FIG. 3. While the apparatus 20 may be employed, for example, by a serving cell 12, or a neighbor cell 16 and the apparatus 30 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with some example embodiments described herein. The processing circuitry may be configured to perform data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the apparatus 20. In an alternative example embodiment, the processing circuitry 22 may be embodied in a modem (e.g., cellular modem 21).

The device interface 28 may include one or more interface mechanisms for enabling communication with other devices, such as one or more mobile terminals 10. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., a UMTS modem, a LTE™ modem, etc.), and/or an optional non-cellular modem 23 (e.g., a WiFi™ modem, WLAN modem, etc.) for enabling communications with other terminals (e.g., WiFi™ terminals, WLAN terminals, access points (APs), etc).

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The processing circuitry 22 which includes the processor 24 and memory 26 may be in communication with or otherwise control a RLC entity 25. The RLC entity 25 may be any means such as a device or circuitry operating in accordance with software or otherwise embodied in hardware or a combination of hardware and software (e.g., processor 24 operating under software control, the processor 24 embodied as an ASIC or FPGA specifically configured to perform the operations described herein, or a combination thereof) thereby configuring the device or circuitry to perform the corresponding functions of the RLC entity 25, as described below.

The RLC entity 25 may include data in a RLC PDU(s) for a corresponding logical channel. The RLC entity 25 may also facilitate retransmissions of data (e.g., data packets) that were not received by a receiving device (e.g., UE 10) or was received with errors and may perform any other suitable operations described herein.

In one embodiment, the mobile terminals 10 may be embodied as or otherwise include an apparatus 30 as generically represented by the block diagram of FIG. 3. In this regard, the apparatus may be configured to provide for communications with the eNB 12 or another terminal(s) via a communications system (e.g., a UMTS, a LTE™ system, etc.). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 30 may include or otherwise be in communication with a processing system including, for example, processing circuitry 32 that is configurable to perform actions in accordance with some example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile computing device or other mobile terminal. In an alternative example embodiment, the processing circuitry 32 may be embodied in a modem (e.g., cellular modem 40).

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., a UMTS modem, a LTE™ modem, etc.) for supporting communications with the eNB 12 and an optional non-cellular modem 42 (e.g., a WiFi™ modem, WLAN modem, Bluetooth™ (BT) modem, etc.) for supporting communications with other terminals (e.g., a WiFi™ station(s), a WLAN station(s)), etc.).

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor.

As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein. The processing circuitry 32 which includes the processor 34 and memory 36 may be in communication with or otherwise control a RLC entity 35. The RLC entity 35 may be any means such as a device or circuitry operating in accordance with software or otherwise embodied in hardware or a combination of hardware and software (e.g., processor 34 operating under software control, the processor 34 embodied as an ASIC or FPGA specifically configured to perform the operations described herein, or a combination thereof) thereby configuring the device or circuitry to perform the corresponding functions of the RLC entity 35, as described below.

The RLC entity 35 may include data in a RLC PDU for a corresponding logical channel. The RLC entity 35 may also facilitate retransmissions of data (e.g., data packets) that were not received by a receiving device (e.g., eNB 12) or were received with errors and may perform any other suitable operations described herein.

In an example embodiment, an eNB 12 may initially indicate to a UE 10 a transport block size and may provide this information to the UE 10 via a physical channel such as, for example, a Physical Downlink Control Channel (PDCCH). As such, a MAC layer of the UE 10 may analyze the transport block size information received from the eNB 12 and may know the transport block size for different logical layers. In this regard, the MAC layer may indicate to an RLC entity (e.g., RLC entity 35) a transport block size for a corresponding logical channel.

In an example embodiment, in an instance in which a transmission is sent from a sending device to a receiving device and the transmission of data is incorrect, the receiving device may send a status report to the sending device informing the sending device which data (e.g., blocks of data of a transport block) were incorrect or missing. In this regard, the sending device may retransmit the incorrect or missing data, in one or more RLC PDUs, to the receiving device. In one example embodiment, the sending device may be UE 10 and the receiving device may be eNB 12 in an uplink communication direction. As such, in this example embodiment, the eNB 12 (e.g., the receiving device) may generate a status report that may be sent to the UE 10 requesting retransmission of one or more data packets that were received, by the eNB 12, incorrectly or missing in a transmission of data from the UE 10 (e.g., the sending device).

On other hand, in another example embodiment, the sending device may be the eNB 12 and the receiving device may be the UE 10 in a downlink communication direction. In this example embodiment, the UE 10 (e.g., the receiving device) may generate a status report that may be sent to the eNB 12 requesting retransmission of one or more data packets that were received incorrectly or missing by the UE 10, in a transmission of data from the eNB 12 (e.g., the sending device). In one example embodiment, the sending device may be a UE 10 and the receiving device may be another UE 10.

In an example embodiment, a RLC entity (e.g., RLC entity 25, RLC entity 35) may not transmit any PDU(s) including new data that may exceed a variable fixed size (e.g., half the size) of a transport block that is going to be used to carry the PDU(s). On the other hand, a retransmitted PDU(s) may be of any size and may not necessarily adhere to the size limit so long as a corresponding transport block(s) has the capacity and size to carry the retransmitted PDU(s). As referred to herein, new data may denote one or more items of data that is being transmitted the first time. The criteria that no PDU including new data may exceed a variable fixed size limit (also referred to herein as predetermined size) (e.g., half the transport block size) of a transport block may apply to all transport blocks, including transport blocks in which the retransmissions take place. In some example embodiments, the retransmissions may take so much space from a transport block that the remaining space available for new data is rather small and as such no PDU including new data could exceed half the transport block size.

On the other hand, in some example embodiments, one or more retransmitted PDUs may take less than half of a transport block and the remaining space available for new data transmission may be larger than half of the transport block size. In this instance, an RLC entity (e.g., RLC entity 25, RLC entity 35) may split the new data into two pieces in order to satisfy the criteria that no PDU including new data may exceed a predetermine size (e.g., half) of a transport block that is going to be used to carry the PDU.

Additionally, an RLC entity of an example embodiment may facilitate allocations to different logical channels that are handled flexibly so that needed capacity may be borrowed from another logical channel for retransmissions. In some example embodiments, the retransmission of an RLC PDU may be delayed by a RLC entity in an instance in which a transport block happens to be too small in one transmission opportunity, as described more fully below. Disallowing any PDU including new data to exceed a predetermined size (e.g., half the size) of a transport block and allocating different logical channel capacity for retransmissions as well as delaying retransmission of one or more PDUs may remove the need for re-segmentation exhibited by some of the existing ARQ solutions.

In one example embodiment, in an instance in which a RLC entity (e.g., RLC entity 25, RLC entity 35) detects that transmitted data was undelivered or detects an error(s) (also referred to herein as incorrectly received data) in data transmitted to a receiving device, the RLC entity may generate a RLC PDU for retransmission of the undelivered/incorrectly received data. As described above, the retransmitted RLC PDU(s) may be of any size and may not necessarily adhere to a variable fixed size limit (e.g., half the size of a transport block, 60% of the size of the transport block, etc.) so long as a transport block has the capacity and the size to carry the retransmitted RLC PDU(s). In this regard, a transport block may include all or at least a portion of an RLC PDU(s) that includes undelivered data or incorrect data for retransmission in the transport block.

Referring now to FIG. 4, a diagram illustrating transport blocks including PDUs generated from data of two logical channels is provided. In FIG. 4, each of the columns represents a transport block which is filled with RLC PDUs which are generated from the data of two logical channels (e.g., logical channel 1, logical channel 2). In the example embodiment of FIG. 4, logical channel 1 may be denoted by visible indicia 27, logical channel 2 may be denoted by visible indicia 29 and retransmitted data (e.g., retransmitted PDUs) may be denoted by visible indicia 18. In some example embodiments, visible indicia 27 and visible indicia 29 may denote data that is transmitted for the first time. The horizontal axis may represent time, but is not necessarily drawn to scale. As such, the adjacent transport blocks in FIG. 4 are not necessarily in the adjacent radio frames or sub-frames, and instead they just represent consecutive transmission opportunities for a device (e.g., UE 10, eNB 12). The numbers at the top of FIG. 4 do not represent any frame numbers or sequence numbers, but instead facilitate references to objects of FIG. 4. In the example embodiment of FIG. 4, the heights of the columns indicate the sizes of the transport blocks and different heights illustrate that the size of the transport blocks are variable. The size of the transport block may be shared by the RLC PDUs of the two logical channels and the height of each section of a transport block indicates the size of each PDU.

The transport blocks that are marked with items of visible indicia 17 and 19 (also referred to herein interchangeably as explosion symbols 17 and 19) may not be received correctly by a peer RLC entity (e.g., RLC entity 25), so they may be retransmitted, by a corresponding RLC entity (e.g., RLC entity 35) of a sending device (e.g., UE 10) according to status reports sent by a receiving device (e.g., eNB 12). The retransmissions are indicated with items of visible indicia 18 and each arrow indicates the initial transmission of the RLC PDU for retransmission of undelivered or incorrectly received data.

In the example embodiment of FIG. 4, a size of each individual PDU may be determined by a RLC entity (e.g., RLC entity 35) such that a PDU including new data does not exceed a variable fixed size limit (e.g., half of the size) of an allocated transport block. For instance, in FIG. 4, the transport block number 1 is filled with two PDUs with half the size of the transport block. In the example embodiment of FIG. 4, each of logical channels need not have two PDUs. For instance, the item of data for the logical channel 1 PDU in the transport block 2 need not necessarily be split into smaller pieces, because the allocation for the logical channel 1 is already smaller than half of the size of transport block 2.

As shown in FIG. 4, an RLC entity (e.g., RLC entity 35) determined that data transmitted in transport block 4 failed, was in error, or was otherwise undelivered as indicated by explosion symbol 17. In one example embodiment, an RLC entity (e.g., RLC entity 35) of a sending device (e.g., UE 10) may determine which data of a transport block failed or was incorrectly received based on evaluating data of a status report sent by a RLC entity (e.g., RLC entity 25) of receiving device (e.g., eNB 12). In the example embodiment of FIG. 4, the RLC entity (e.g., RLC entity 35) of the sending device (e.g., UE 10) determined that all of the data of the transport block 4 was received in error or undelivered.

In the example embodiment of FIG. 4, the RLC entity of the sending device may retransmit RLC PDUs that were first transmitted in transport block 4 but which were received in error or undelivered in transport block 7, where the retransmission is carried out. Since transport block 7 is larger than the original transport block 4, there is space for a first transmission of some new data 48 as well. As such, the RLC entity (RLC entity 35) of the sending device (e.g., UE 10) may include some new data 48 along with the retransmitted data in transport block 7. In the example embodiment of FIG. 4, each of the RLC PDUs 31, 33 of transport block 4 may be retransmitted as RLC PDUs 37, 39 in transport block 7 since transport block 7 is bigger than transport block 4. It should be pointed out that since the RLC PDUs of transport block 4 were on logical channel 1, the RLC PDUs 37, 39 retransmitted in transport block 7 are also on logical channel 1. In other words, RLC PDUs are retransmitted on the same logical channel that they were first transmitted on when data of the RLC PDUs were received in error or undelivered.

The retransmission of the RLC PDUs 41, 43, 45 that were first transmitted in transport block 8 but which were received in error or undelivered may be more complex, because the transport block 11, which happens to be the first retransmission opportunity after receiving a status report from a receiving device (e.g., a RLC entity 25 of eNB 12), is smaller than the original transport block 8. In fact, transport block 11 is so small that it is unable to carry either of the RLC PDUs 41, 43 of logical channel 1. However, the smallest RLC PDU 45 may be retransmitted as RLC PDU 47 in transport block 11 by an RLC entity (e.g., RLC entity 35) of a sending device (e.g., UE 10) and the other RLC PDUs 41, 43 may be retransmitted by the RLC entity (e.g., RLC entity 35) in the subsequent transport blocks 12 and 13 as RLC PDUs 49 and 51, respectively. In some example embodiments, the retransmitted RLC PDUs may take less than half of the transport block and the remaining space available for new data transmission may be larger than half of the transport block size. In such an instance, the new data may be split, by an RLC entity, into two pieces of new data 53, 55 in order to satisfy the criteria that no RLC PDU including new data may exceed half the transport block size. In the existing LTE solution, re-segmentation would have been required, but this new scheme of an example embodiment makes the retransmission possible without re-segmentation, or any other modifications to the original PDUs (e.g., RLC PDUs 41, 43, 45).

It should be pointed out that in the example embodiment of FIG. 4, the RLC PDUs 31, 33 of transport block 4 may be retransmitted in transport block 7, as opposed to one or more of transport blocks 5 or 6, for example, to provide some time delay prior to retransmitting the RLC PDUs 31, 33. Similarly, the RLC PDUs 41, 43, 45 of transport block 8 may be retransmitted in transport blocks 11, 12 and 13, as opposed to one or more of transport blocks 9 and 10, for example, to provide some time delay prior to retransmitting the RLC PDUs 41, 43, 45. In some other example embodiments, the retransmitted RLC PDUs that were incorrectly received or undelivered may be transmitted immediately in one more subsequent transport blocks of sufficient size to carry the retransmitted RLC PDUs.

In some example embodiments, the retransmissions may override the resource allocation granted by an eNB (e.g., eNB 12). For instance, the eNB (e.g., eNB 12) may have signaled to a UE (e.g., UE 10) that half of the size of transport block 12 should be used by the logical channel 1 and the other half by logical channel 2. In some example embodiments, similar allocations of the transport block space may be determined by an entity in the UE (e.g., MAC in LTE). However, the retransmission of RLC PDUs may require that about 70% of the size of the transport block 12 be used for logical channel 1. In this regard 20% of the capacity of logical channel 2 may be borrowed by an RLC entity (e.g., RLC entity 35) to carry or transfer the retransmitted RLC PDUs (e.g., retransmitted data that is 70% of the size of the transport block 12). As such, logical channel 2 may use the remaining 30% of transport block 12. In general, this may be acceptable from the upper layer perspective of a sending device (e.g., UE 10) and follows the general principle of giving retransmissions the priority over the new transmissions.

In some example embodiments, instead of defining a fixed size limit (e.g., a variable fixed size) such as, for example, half of the size of a transport block as a maximum RLC PDU size, an RLC entity may use another transport block size as the maximum RLC PDU size. In this regard, no PDU may include new data exceeding the maximum RLC PDU size of a transport block. In other words, the size limit may be some fixed limit (e.g., a fraction of the size of the transport block (e.g., 60/100=60% of the size of the transport block, etc.)) other than one half of the transport block size. The fixed size limit (e.g., the maximum RLC PDU size) may be an absolute value expressed in bits, bytes, or some other units or a fixed fraction of the transport block size. The fixed size limit may be predetermined or configured by suitable signaling. For example, the fixed size may be predetermined and may be pre-stored in a memory (e.g., memory 26, memory 36) of a device (e.g., eNB 12, UE 10). Alternatively, the fixed size may be configured by an eNB 12 which may signal a fixed value indicating the size that is designated for usage by a UE (e.g., UE 10). In some embodiments, the fixed size limit may be based on some other size than the size of a next or subsequent transport block(s). For example, a RLC entity may first determine a reference size to be the moving average of the sizes of the last (or previous) n transport blocks (e.g., n may be a fixed or configured value). In other example embodiments, instead of the arithmetical average, other statistical quantities such as, for example, a median, minimum, or maximum may be used by an RLC entity to determine a reference size. The PDU size limit may then be some fraction (e.g., 60/100=60%) of the reference size (e.g., an average size of the last (or previous) n transport blocks).

In some example embodiments, a predetermined fixed value (e.g., 60% of the transport block size) may be a default value if any other value is not signaled. For purposes of illustration and not of limitation, a UE 10 may have a predetermined fixed value (e.g., 60% of the transport block size) as a default value for the maximum RLC PDU size but an eNB 12 may signal or provide a new value for the maximum RLC PDU size that the UE 10 is to utilize.

In some embodiments, the signaled value provided by the eNB 12 to the UE 10 may be accompanied by a timer which may specify the amount of time in which the signaled value is valid. For instance, when the timer expires, the default size limit (e.g., 60% of the transport block size) may be applied by an RLC entity (e.g., RLC entity 25 of UE 10).

In an example embodiment, in an instance in which a transport block is so small (e.g., not large enough) that any pending retransmission cannot be carried out, a sending device (e.g., UE 10) may send a control message to a receiving device (e.g., eNB 12) and may inform the receiving device regarding the size of a transport block that is needed to retransmit the one or more pending PDUs. In this regard, the receiving device (e.g., eNB 12) may allocate one or more temporary transport blocks, in a message, to send the retransmission of one or more pending PDUs. In some example embodiments, the largest pending PDU for retransmission may be retransmitted first. However, in some alternative example embodiments, pending PDUs that are smaller than the largest pending PDU for retransmission may be sent first.

In one example embodiment, the control message may be sent by the sending device (e.g., UE 10) to a receiving device (e.g., eNB 12) immediately in response to detecting that a transport block is not large enough for a pending retransmission. In another example embodiment, the sending of the control message by the sending device (e.g., UE 10) to a receiving device (e.g., eNB 12) may be delayed for a short time or for a small number of transmission opportunities in order to avoid unnecessarily sending the control message. In yet another example embodiment, the control message that may be sent by a sending device (e.g., UE 10) to a receiving device (e.g., eNB 12) may be the existing buffer status report which may have an extension for a parameter informing the receiving device of the needed transport block size. In this example embodiment, the buffer status report may also provide the temporary block size needed to retransmit one or more pending PDUs.

In one example embodiment, the retransmissions may be sent by an RLC entity in such an order that the oldest PDUs (e.g., the PDUs with the smallest sequence number) are retransmitted first by the RLC entity (e.g., RLC entity 25 of UE 10). In some alternative example embodiments, an RLC entity may retransmit PDUs first even in instances in which the PDU(s) may not be the oldest in order to maximize the probability that PDUs may be retransmitted as soon as possible. In this regard, for example, large blocks may be preferred over small blocks. As such, PDUs that are larger may have priority and may be transmitted, by an RLC entity, prior to smaller PDUs even in instances in which the smaller PDUs are older and created prior to the larger PDUs.

In one example embodiment, for example, the largest of the pending PDUs that fits to a corresponding transport block may be transmitted first by a RLC entity (e.g., RLC entity 25). In another example embodiment, the largest of the pending PDUs that fits to a next or subsequent transport block(s) and was originally transmitted in the same transport block may be transmitted first by a RLC entity (e.g., RLC entity 25).

For purposes of illustration and not of limitation, consider transport block 8 of FIG. 4. In this example embodiment, presume that the PDU 41 has a smaller sequence number than a sequence number of PDU 43. Further, presume that the PDU 43 is larger than the PDU 41. In this example embodiment, an RLC entity may retransmit the PDU 43 which is larger, for example in transport block 13, first and may subsequently transmit PDU 41, for example in transport block 12, which has a smaller size relative to PDU 43. The RLC entity may retransmit the PDU 43, which is larger, first even though PDU 41 has a smaller sequence number denoting that PDU 41 is older or was created prior to PDU 43.

In another example embodiment, the largest of the pending PDUs that fits to a next or subsequent available transport block(s) and has not waited for retransmission for longer than a fixed or configured maximum time (also referred to herein as predetermined time) is transmitted first. On the other hand, in this example embodiment, a RLC entity may retransmit a pending PDU(s) that may be smaller than other pending larger PDUs in an instance in which the smaller PDU(s) is not previously transmitted upon expiration, or elapsing, of the maximum time. In this regard, smaller pending PDUs may be retransmitted after waiting a predetermined time even though larger pending PDUs are also waiting to be retransmitted.

Referring now to FIG. 5, a flowchart is provided of an example method for transmitting data. At operation 500, an apparatus (e.g., UE 10) may detect one or more items of data that were transmitted with at least one error or unsuccessfully delivered to a device (e.g., eNB 12). At operation 505, an apparatus (e.g., UE 10) may enable retransmission of the items of data (e.g., PDUs 37, 39, 47, 49, 51) in one or more transport blocks (e.g., transport block 7 and/or transport blocks 11, 12, 13).

At operation 510, an apparatus (e.g., UE 10) may enable transmission of one or more items of new data (e.g., a PDU including new data (e.g., new data 48, 53, 55)) in the one or more transport blocks such that a size of the new data does not exceed a variable size limit (e.g., half) of a transport block size. The variable size limit may be dependent on one or more sizes of one or more transport blocks (e.g., an average size of the sizes of n preceding transport blocks, etc.). At operation 515, an apparatus (e.g., UE 10) may determine that the variable size limit includes a size smaller than a size of one or more transport blocks.

Referring now to FIG. 6, a flowchart is provided of an example method for transmitting data. At operation 600, an apparatus (e.g., eNB 12) may enable provision of a status report to a device (e.g., UE 10) indicating one or more items of data that were received with at least one error or unsuccessfully delivered. At operation 605, an apparatus (e.g., eNB 12) may receive a retransmission, from the device (e.g., UE 10), of the items of data (e.g., PDUs 37, 39, 47, 49, 51) in one or more transport blocks (e.g., transport block 7 and/or transport blocks 11, 12, 13) in response to receipt of the status report.

At operation 610, an apparatus (e.g., eNB 12) may receive, from the device (e.g., UE 10), one or more items of new data (e.g., a PDU including new data (e.g., new data 48, 53, 55)) in the one or more transport blocks such that a size of the new data does not exceed a variable size limit (e.g., half) of a transport block size. The variable size limit may be dependent on one or more sizes of one or more transport blocks (e.g., an average size of the sizes of n preceding transport blocks, etc.). In addition, the variable size limit may have a size smaller than a size of one or more transport blocks.

It should be pointed out that FIGS. 5 and 6 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34, the RLC entity 25, the RLC entity 35). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In an example embodiment, an apparatus for performing the methods of FIGS. 5 and 6 above may comprise a processor (e.g., the processor 24, processor 34, the RLC entity 25, the RLC entity 35) configured to perform some or each of the operations (500-515, 600-610) described above. The processor may, for example, be configured to perform the operations (500-515, 600-610) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (500-515, 600-610) may comprise, for example, the processor 24 (e.g., as means for performing any of the operations described above), the processor 34, the RLC entity 25, the RLC entity 35 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for transmission of data, the apparatus comprising: circuitry configured to detect one or more items of data that were transmitted with at least one error or unsuccessfully delivered to a device;
    enable retransmission of the items of data in at least one transport block;
    enable transmission of one or more items of new data in the at least one transport block such that a size of a protocol data unit including the new data does not exceed a variable size limit within a transport block, the variable size limit being dependent on one or more sizes of one or more transport blocks;
    determine that the variable size limit comprises a size that is smaller than a size of the at least one transport block;
    determine a predefined size of another transport block for allocation of resources on a first logical channel of the another transport block and a predetermined size of the another transport block for a second allocation of resources on a second logical channel of the another transport block; and
    override the first and second allocation of resources in an instance in which a size of items of content for retransmission on the first logical channel exceeds the predefined size of the another transport block.

2. The apparatus of claim 1, wherein the retransmission of the items of data conforms to an automatic repeat request protocol.

3. The apparatus of claim 1, wherein the variable size limit comprises a size that is half a size of the at least one transport block.

4. The apparatus of claim 1, wherein the processing circuitry is configured:
    determine that the variable size limit comprises a fixed fraction of a size of the at least one transport block.

5. The apparatus of claim 1, wherein the processing circuitry is configured:
    determine that the variable size limit comprises an average size of sizes of a plurality of transport blocks preceding the at least one transport block.

6. The apparatus of claim 1, wherein the processing circuitry is configured:
    change the variable size limit to a different defined size limit of the transport block in response to receipt of an indication, from the device, specifying the different defined size limit.

7. The apparatus of claim 6, wherein the different defined size limit comprises data indicating a time period that the different defined size limit is valid.

8. The apparatus of claim 7, wherein the processing circuitry is configured:
    utilize the variable size limit as a maximum size for the new data in the at least one transport block upon expiration of the time period.

9. The apparatus of claim 1, wherein the retransmission of the items of data conforms to an automatic repeat request protocol of a Long Term Evolution system.

10. An apparatus for transmission of data, the apparatus comprising: circuitry configured to detect one or more items of data that were transmitted with at least one error or unsuccessfully delivered to a device; enable retransmission of the items of data in at least one transport block; enable transmission of one or more items of new data in the at least one transport block such that a size of a protocol data unit including the new data does not exceed a variable size limit within a transport block, the variable size limit being dependent on one or more sizes of one or more transport blocks; determine that the variable size limit comprises a size that is smaller than a size of the at least one transport block; enable retransmission of the items of content on the first logical channel of the another transport block by facilitating retransmission of a first subset of the items of content on the first logical channel, the first subset of the items of content comprising a size equal to the predefined size; and facilitate retransmission of a remaining subset of the items of content on the first logical channel in response to borrowing a portion of the predetermined size, initially allocated to the second logical channel, to retransmit the remaining subset of the items of content, wherein the remaining subset of the items of content comprise a size equal to a size of the borrowed portion of the predetermined size.

11. A method for transmission of data performed by an apparatus, the method comprising: detecting one or more items of data that were transmitted with at least one error or unsuccessfully delivered to a device; retransmitting the items of data in at least one transport block; transmitting one or more items of new data in the at least one transport block such that a size of a protocol data unit including the new data does not exceed a variable size limit within a transport block, the variable size limit being dependent on one or more sizes of one or more transport blocks; determining that the variable size limit comprises a size that is smaller than a size of the at least one transport block; determining a predefined size of another transport block for allocation of resources on a first logical channel of the another transport block and a predetermined size of the another transport block for a second allocation of resources on a second logical channel of the another transport block; and overriding the first and second allocation of resources in an instance in which a size of items of content for retransmission on the first logical channel exceeds the predefined size of the another transport block.

12. The method of claim 11, wherein the items of data are retransmitted according to an automatic repeat request protocol.

13. The method of claim 11, wherein the variable size limit comprises a size that is half a size of the at least one transport block.

14. The method of claim 11, further comprising:

determining that the variable size limit comprises a fixed fraction of a size of the at least one transport block.

15. The method of claim 11, further comprising:

determining that the variable size limit comprises an average size of sizes of a plurality of transport blocks preceding the at least one transport block.

16. The method of claim 11, further comprising:

changing the variable size limit to a different defined size limit of the transport block in response to receipt of an indication, from the device, specifying the different defined size limit.

17. The method of claim 16, wherein the different defined size limit comprises data indicating a time period that the different defined size limit is valid.

18. The method of claim 17, further comprising:

utilizing the variable size limit as a maximum size for the new data in the at least one transport block upon expiration of the time period.

* * * * *